(12) United States Patent
Levanon et al.

(10) Patent No.: US 9,743,592 B2
(45) Date of Patent: Aug. 29, 2017

(54) METHOD OF INDOOR MUSHROOM CULTIVATION

(71) Applicant: Netafim, Ltd., Tel Aviv (IL)

(72) Inventors: Dan Levanon, Kfar Blum (IL); Ofer Danay, Hilla (IL); Dov Raz, Kibbutz Magal (IL)

(73) Assignee: Netafim, Ltd., Tel Aviv (IL)

( * ) Notice: Subject to any disclaimer, the term of this patent is extended or adjusted under 35 U.S.C. 154(b) by 172 days.

(21) Appl. No.: 14/386,073

(22) PCT Filed: Feb. 4, 2013

(86) PCT No.: PCT/IB2013/050945
§ 371 (c)(1),
(2) Date: Sep. 18, 2014

(87) PCT Pub. No.: WO2013/140270
PCT Pub. Date: Sep. 26, 2013

(65) Prior Publication Data
US 2015/0096224 A1  Apr. 9, 2015

Related U.S. Application Data

(60) Provisional application No. 61/612,698, filed on Mar. 19, 2012.

(51) Int. Cl.
*A01G 1/04* (2006.01)
(52) U.S. Cl.
CPC .............. *A01G 1/04* (2013.01); *A01G 1/042* (2013.01)
(58) Field of Classification Search
CPC ........... A01G 1/04; A01G 1/042; A01G 1/044
USPC ................................ 47/1.1, 48.5, 58.1 R, 79
See application file for complete search history.

(56) References Cited

U.S. PATENT DOCUMENTS

| | | | | |
|---|---|---|---|---|
| 3,309,875 A | * | 3/1967 | Niederwemmer | A01G 25/06 37/142.5 |
| 3,361,359 A | * | 1/1968 | Chapin | A01G 25/02 239/145 |
| 3,810,327 A | * | 5/1974 | Giansante | A01G 1/042 165/222 |
| 3,874,182 A | * | 4/1975 | Potter | E02F 5/12 405/179 |

(Continued)

FOREIGN PATENT DOCUMENTS

| | | |
|---|---|---|
| GB | 2174429 | 11/1986 |
| GB | 2426906 | 12/2006 |

(Continued)

OTHER PUBLICATIONS

International Search Report dated Sep. 25, 2013 issued in PCT counterpart application (No. PCT/IB2013/050945).

(Continued)

*Primary Examiner* — David Parsley
*Assistant Examiner* — Danielle Clerkley
(74) *Attorney, Agent, or Firm* — Womble Carlyle

(57) ABSTRACT

For indoor mushroom cultivation, a method of irrigating the mushrooms includes drip irrigation pipes in the bed. The drip irrigation pipes can be disposed in a casing layer that overlies a substrate layer, and irrigation can be according to measurements taken in the environment outside of the bed.

34 Claims, 3 Drawing Sheets

(56) References Cited

U.S. PATENT DOCUMENTS

| | | | | |
|---|---|---|---|---|
| 4,001,966 | A * | 1/1977 | Metzner | A01G 1/042 206/511 |
| 4,059,227 | A * | 11/1977 | Hunter | A01G 25/16 137/41 |
| 4,337,594 | A * | 7/1982 | Hanacek | A01G 1/04 264/45.3 |
| 4,462,184 | A * | 7/1984 | Cunningham | E01C 13/083 405/37 |
| 4,833,820 | A * | 5/1989 | Nishio | A01G 1/04 47/1.1 |
| 5,209,015 | A * | 5/1993 | De Filippi | A01G 27/003 47/48.5 |
| 6,748,696 | B1 * | 6/2004 | Davidson | A01G 1/042 435/254.1 |
| 7,237,982 | B2 * | 7/2007 | Crea | E02F 5/102 405/179 |
| 7,407,340 | B2 * | 8/2008 | Byles | A01G 1/00 405/43 |
| 7,712,253 | B2 * | 5/2010 | Gesser et al. | A01G 31/02 405/43 |
| 8,132,739 | B2 * | 3/2012 | Theor t | A01G 9/245 239/13 |
| 2007/0094925 | A1 * | 5/2007 | Andersen | A01C 23/042 47/48.5 |
| 2008/0196303 | A1 * | 8/2008 | Kim | A01G 25/02 47/48.5 |
| 2009/0025287 | A1 * | 1/2009 | Lee | A01G 7/00 47/17 |
| 2010/0005716 | A1 * | 1/2010 | Byles | A01G 29/00 47/48.5 |
| 2010/0319251 | A1 | 12/2010 | Su | |
| 2011/0259969 | A1 * | 10/2011 | Ruttenberg | A01G 25/02 239/1 |

FOREIGN PATENT DOCUMENTS

| | | | | |
|---|---|---|---|---|
| NL | WO 2009051481 | A2 * | 4/2009 | A01G 1/042 |
| WO | WO 89/05574 | A1 | 6/1989 | |
| WO | WO 01/43532 | | 6/2001 | |
| WO | WO 01/43532 | A1 | 6/2001 | |
| WO | WO 02/068611 | | 9/2002 | |
| WO | WO 2006/090965 | | 8/2006 | |
| WO | WO 2006/090965 | A1 | 8/2006 | |
| WO | WO 2010/095932 | | 8/2010 | |
| WO | WO 2010/095932 | A1 | 8/2010 | |

OTHER PUBLICATIONS

Written Opinion dated Sep. 25, 2013 issued in PCT counterpart application (No. PCT/IB2013/050945).

* cited by examiner

METHOD OF INDOOR MUSHROOM CULTIVATION

RELATED APPLICATIONS

This is a 35 USC 371 U.S. National Phase of International Application No. PCT/IB2013/050945, filed 4 Feb. 2013 and published in English as WO 2013/140270A2 on 26 Sep. 2013, which claims priority to U.S. Provisional application No. 61/612,698, filed 19 Mar. 2012. The contents of the aforementioned applications are incorporated by reference in their entirety.

TECHNICAL FIELD

Embodiments of the invention relate to methods of indoor mushroom cultivation, growing or production.

BACKGROUND

Indoor commercial production of mushrooms allows for tight regulation of growing conditions such as air, temperature and relative humidity while substantially eliminating contaminants and pests. This technique typically employs trays or beds for growing the mushrooms which provides the advantages of scalability and easier harvesting. The trays or beds typically include a substrate such as compost and a casing soil that is disposed above the substrate.

The casing soil serves as a water reservoir for the mushrooms and a typical watering technique employed includes spraying the beds or trays from above. While using such a spraying technique it is normally required during certain stages of mushroom growth to stop the watering in order to limit the sprayed water from coming into contact with the developing mushrooms. Wet mushrooms may also enhance occurrence of mushroom diseases such as bacterial blotch. At this time, since watering is halted, the water content in the casing and substrate may decrease to below optimal levels.

PCT Publication No. WO 2006/090965 describes a certain type of drip irrigation tube with scar cuts that are formed on rubber dripping elements. These scars are prevented from direct exposure with the culture medium layer in order to prevent mycelia from being coated in these scar cuts which will clog the exit for water.

The ability to effectively add water to the casing layer without wetting the mushrooms may be seen to have the advantages of: adding the needed water to the mushrooms during the entire crop cycle, minimizing the incidence of mushroom diseases, enhancing mushroom quality, and reducing costs of casing and energy.

SUMMARY

The following embodiments and aspects thereof are described and illustrated in conjunction with systems, tools and methods which are meant to be exemplary and illustrative, not limiting in scope.

The present invention is expressed by the features of the independent claims and aspects. The dependent claims and aspects refer to preferred embodiments.

Embodiments of the present invention relate to methods for irrigation and cultivating mushrooms using drip irrigation pipes in an indoor environment. By irrigating mushroom with drip pipes as opposed to conventional irrigation with sprinklers, damage to mushrooms may be avoided or limited and irrigation may be performed during longer and more regular intervals.

In one form of the present invention the method may comprise steps of providing a horizontally extending bed in which a substrate layer and a casing layer that is disposed over the substrate layer are provided. And, the drip irrigation pipes are disposed in the bed preferably in the casing layer.

In one aspect of the present invention irrigation via the drip irrigation pipes is affected by measurements of water evaporation in the indoor environment outside of the bed. These measurements may derive a value M which may be taken periodically. Possibly these measurements can be taken every N hours with N being either a fraction smaller than 1 hour or any value larger than 1 hour.

In various forms of the present invention from the measurements of water evaporation an amount of liquid to be irrigated can be derived and irrigated preferably in pulses to the bed and/or mushrooms.

In one aspect of the present invention the irrigated liquid may be used to maintain a generally constant liquid content in the casing layer while gradually decreasing the liquid content in the substrate preferably compost layer. Possibly relative short liquid pulses optionally with long intervals between pulses may result in an irrigation procedure in which liquid is maintained more in the casing layer and seeps less towards the substrate later below the casing layer. Longer irrigation pulses optionally with shorter intervals between pulses may result in more liquid that is irrigated to the bed that then seeps down towards the substrate layer. Since the preferable compost material of the substrate may physically change over time resulting in its reduced liquid holding capacity—it may be preferable as irrigation proceeds to limit the amount of liquid reaching the substrate layer. And this may be achieved by changing pulse length and time intervals between pulses.

Further aspects of the present invention will be apparent also from the following numbered aspects:

1. A method of indoor mushroom cultivation comprising the steps of:
   providing a horizontally extending bed comprising a substrate layer and a casing layer that is disposed over the substrate layer, and
   providing drip irrigation pipes that are disposed in the casing layer.
2. The method according to aspect 1, wherein the disposing of the drip irrigation pipes in the casing layer is performed after the casing layer has been disposed over the substrate layer.
3. The method according to aspect 1 or 2, wherein the disposing of the drip irrigation pipes in the casing layer is by urging the drip irrigation pipes into the casing layer.
4. The method according to aspect 3, and comprising a device for urging the drip irrigation pipes into the casing layer, the device being adapted to move in a horizontal direction above the casing layer.
5. The method according to aspect 4, wherein as the device moves above a given portion of the casing layer it urges at least some of the drip irrigation pipes to be disposed into that given portion. In one form this may be performed by providing the device with a slanted sleeve with one upper end located above the bed and a second lower end located within the bed preferable opening into the casing layer. A drip irrigation pipe threaded though the sleeve with its leading end projecting out beyond the lower end of the sleeve, can then be urged into the bed by moving the device horizontally along the bed towards one end of the bed while keeping the pipe's leading end fixed in place to and/or adjacent e.g. another end of the bed.

6. The method according to anyone of the preceding aspects, wherein the drip irrigation pipes are disposed in the casing layer such that their apertures for discharging liquid face substantially the same given direction. This may assist in more accurately controlling where irrigation is provided and reduce possibility of over irrigation that may harm the crop.
7. The method according to aspect 6, wherein the given direction is up.
8. The method according to anyone of aspects 1 to 7, and further comprising a step of irrigating liquid using the disposed drip irrigation pipes, and wherein an amount A of liquid irrigated is determined according to parameters monitored in the indoor environment outside of the bed and parameters monitored in the bed.
9. The method according to anyone of aspect 8, wherein the amount A of liquid irrigated is irrigated in pulses.
10. The method according to aspect 8, wherein the parameters monitored in the indoor environment outside of the bed are associated to at least one of: a bellow communicating air to and from the indoor environment, a shutter controlling communication of air to and from the indoor environment, a temperature gauge measuring the temperature within the indoor environment outside of the bed.
11. The method according to aspects 8 or 9, wherein the parameters monitored in the bed are at least one of: a moisture sensor in the casing layer, a moisture sensor in the substrate layer, a tensiometer in the casing layer, a tensiometer in the substrate layer.
12. The method according anyone of aspects 8 to 11, wherein the liquid irrigated comprises water and/or nutrient amendments.
13. The method according anyone of aspects 8 to 12, wherein the drip irrigation pipes comprise at each aperture in a respective pipe a drip emitter through which liquid passes before being discharged out of the pipe.
14. The method according to aspect 13, wherein each one of the drip emitters has a discharge-pressure threshold greater than zero so that only when local liquid pressure at a location of an emitter in the pipe is greater than zero the emitter will discharge liquid from the pipe.
15. The method according to aspect 14, wherein each one of the drip emitters is a regulated drip emitter that has a discharge rate of liquid out of the pipe that is substantially independent of variations in local liquid pressure at the location of the emitter in the pipe.
16. The method according to aspect 15, wherein the discharge rate of liquid out of the each drip emitter is lower than 1 liter/hour.
17. The method according to aspect 16, wherein the discharge rate of liquid out of each drip emitter is substantiality 0.7 liter/hour.
18. The method according to anyone of aspects 1 to 7, and further comprising a step of irrigating liquid using the disposed drip irrigation pipes, and wherein an amount A of liquid irrigated is determined according to a measure M taken of water evaporation in the indoor environment outside of the bed.
19. The method according to aspect 18, wherein the measure of water evaporation in the indoor environment outside of the bed is taken every N hours.
20. The method according to aspect 19, wherein the determination of the amount A of liquid irrigated is according to A=M×N×F, wherein F is a parameter determined according to the value of M.
21. The method according to aspect 20, wherein K is a threshold parameter of water evaporation, Fu is a first value for F and Fd is a second value for F that is smaller than Fu, and if M>K then F=Fu and otherwise F=Fd.
22. The method according to aspect 21, wherein when M and K are measured in gram to square meter of water.
23. The method according to anyone of aspects 18 to 22, wherein the amount A of liquid irrigated is irrigated in pulses.
24. The method according to anyone of the preceding aspects, wherein the substrate layer comprises compost and the casing layer comprises peat moss and limestone.
25. A method of indoor mushroom cultivation comprising the steps of:
    providing a horizontally extending bed comprising a substrate layer and a casing layer that is disposed over the substrate layer,
    providing drip irrigation pipes that are disposed in the bed, and
    irrigating liquid using the disposed drip irrigation pipes, wherein an amount A of liquid irrigated is determined according to a measure M taken of water evaporation in the indoor environment outside of the bed.
26. The method according to aspect 25, wherein the measure of water evaporation in the indoor environment outside of the bed is taken every N hours.
27. The method according to aspect 26, wherein the determination of the amount A of liquid irrigated is according to A=M×N×F, wherein F is a parameter determined according to the value of M.
28. The method according to aspect 27, wherein K is a threshold parameter of water evaporation, Fu is a first value for F and Fd is a second value for F that is smaller than Fu, and if M>K then F=Fu and otherwise F=Fd.
29. The method according to aspect 28, wherein when M and K are measured in gram to square meter of water.
30. The method according to anyone of aspects 25 to 29, wherein the amount A of liquid irrigated is irrigated in pulses.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
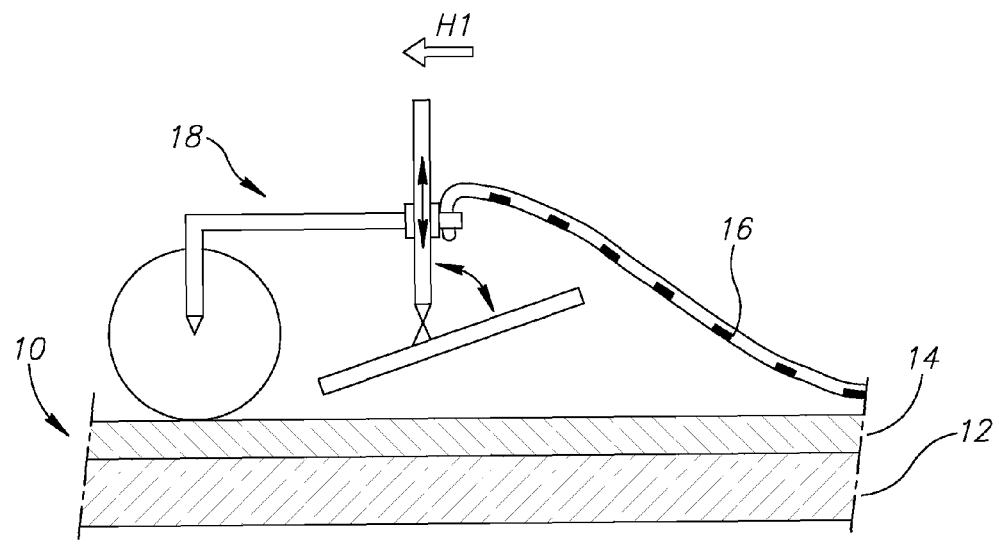
FIGS. 1 and 2 show side views of a bed for mushroom cultivation during optional steps of disposal of drip irrigation pipes therein in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
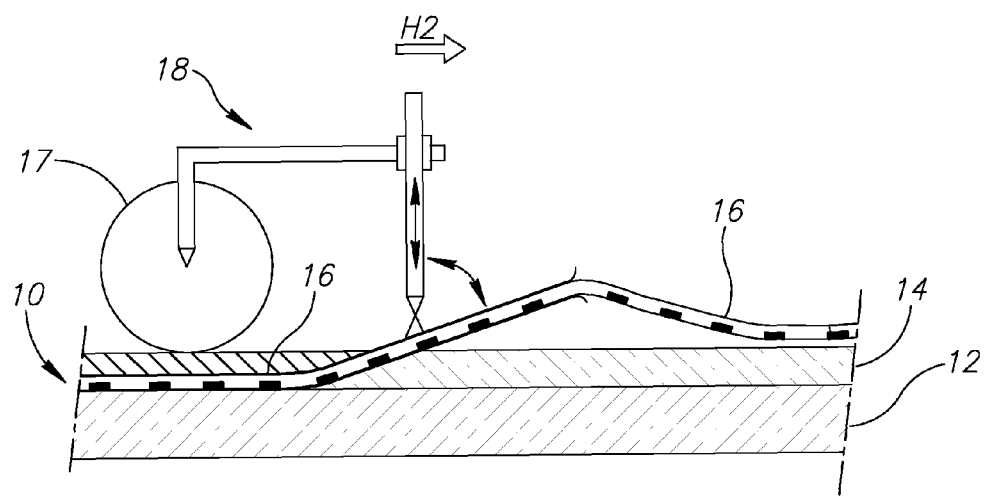

Attention is first drawn to FIGS. 1 and 2. In an embodiment of the present invention, an indoor commercial bed 10 for mushroom cultivation, growth and/or production; may include a tray (not shown) upon which a substrate layer 12 may be laid. Substrate layer 12 optionally consists of compost, and a casing layer 14 optionally consisting of peat moss and/or limestone may be laid upon it. Within the casing layer 14 drip irrigation pipes 16 may be disposed for irrigating mushrooms such as White Button mushrooms/ Champignon and Portobello (scientifically named *Agaricus bisporus*), *Agaricus blazei*, *Lepista nuda*, or the like.

Typical phases of mushroom cultivation may be defined as: Phase I (composting), Phase II (pasteurization and conditioning), Phase III (Spawning and mycelium growth), Casing, Pinning and harvest. The casing phase is when casing layer 14 is laid upon substrate 12 and after that the irrigation pipes 16 can be disposed into the casing layer 14. Irrigation from that point can take place during the entire crop cycle, especially during pinning before the first flush (i.e. harvest of mushrooms) and between flushes when spray irrigation is typically avoided. The irrigation can include water and nutrient-amendments.

For the disposal of the drip irrigation pipes 16 into the casing layer 14 a mechanical device 18 that travels above the bed 10 may be used. Device 18 can be used optionally, by traveling in a horizontal direction H1, for spreading the drip pipes 16 upon the bed 10 (FIG. 1), and then in an opposing second horizontal direction H2, for disposing the drip pipes 16 into casing later 14. An optional roller 17 that trails after device 18 as it disposes the drip pipes into the casing layer can be used to slightly compress the casing layer back into place where it was before the insertion of the pipes (FIG. 2).

Figure 3:
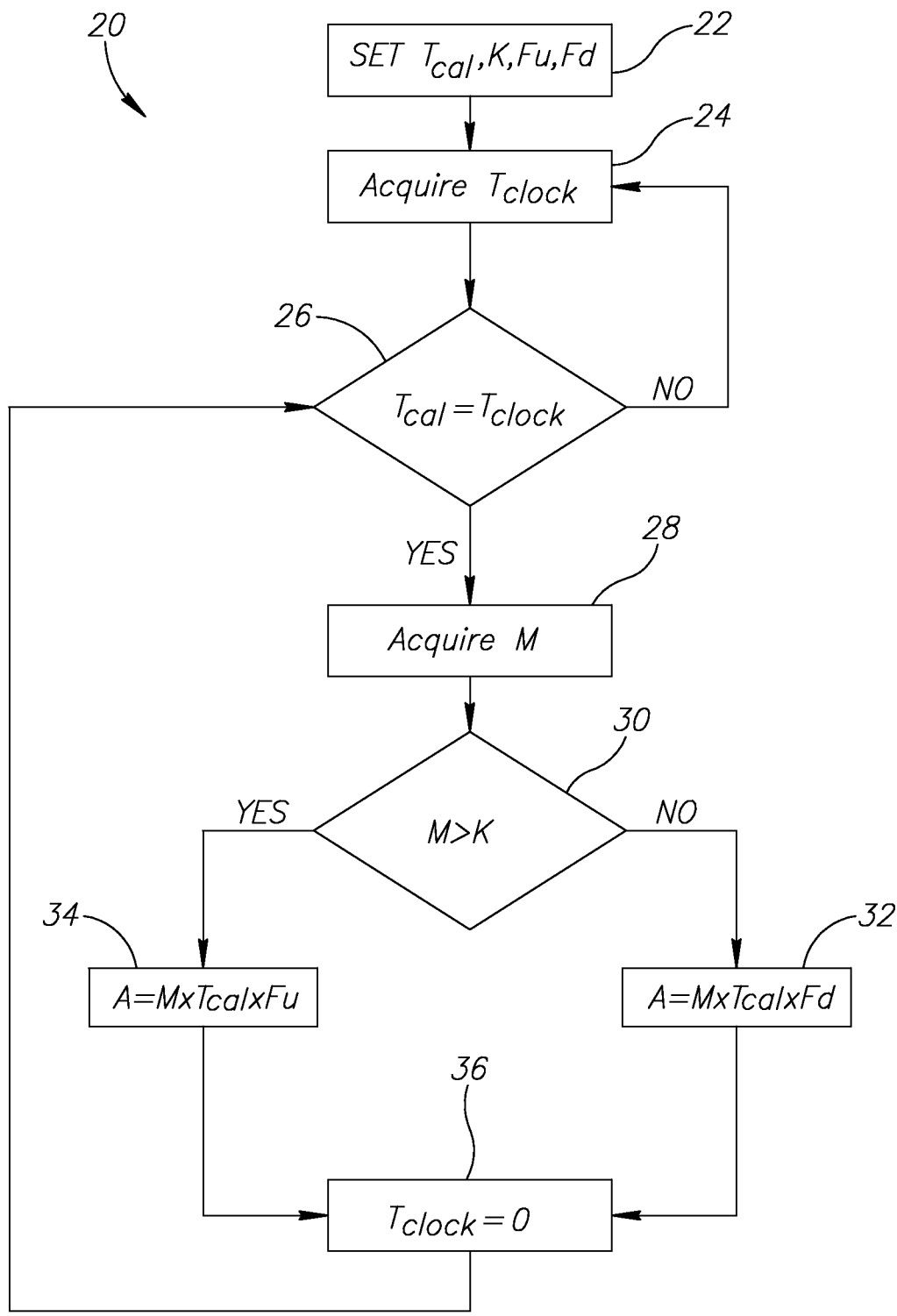
FIG. 3 shows a flow diagram of an algorithm for controlling irrigation of the bed in accordance with an embodiment of the present invention.

In some embodiments of the invention, provision of irrigation to the bed by an irrigation system including the drip irrigation pipes 16 may be controlled in accordance with an algorithm 20 having a flow diagram similar to that shown in FIG. 3. The flow diagram delineates an optionally diurnal water provision cycle in which the irrigation system provides pulses of water to the bed.

In a block 22, optionally values for parameters that control the liquid provision cycle: Tcal, K, Fu and Fd can be determined by optionally being manually inputted by a grower using the irrigation system or his advisor. Tcal is a time during the diurnal cycle at which the irrigation system acquires a measure M of water evaporation in the indoor environment outside of the bed. K is a threshold value of water evaporation, and Fu is a factor used when M is greater than K and Fd is a factor used when M is not greater than K.

In step 24 algorithm 20 checks a system clock (not shown) to acquire a reading of the time, "Tclock". In a decision block 26 the time Tclock is checked to see if it is about equal to Tcal. If it is not, then the algorithm returns to block 24 to acquire a new reading for Tclock. If on the other hand Tclock is about equal to Tcal, algorithm 20 advances to a block 28 and acquires a reading of M of the water evaporation in the indoor environment outside of the bed. The algorithm then proceeds to decision block 30 to check if the acquired reading of M is greater than the threshold value K. If it is not, then the algorithm proceeds to block 32 to determine an amount A of water to be irrigated to the bed according to the equation $A = M \times Tcal \times Fd$. If on the other hand reading M is greater than the threshold value K then the algorithm proceeds to block 34 to determine the amount A of water to be irrigated to the bed according to the equation $A = M \times Tcal \times Fu$. After either block 32 or 34 the algorithm proceeds to a block 36 where T clock is initialized to zero and from there the algorithm returns to decision block 26 to start a consecutive cycle that will lead to a consecutive irrigation cycle.

The needed water amount A, may be divided into pulses of irrigation, that are provided at optionally given time intervals, until the amount A has been fed to the bed.

By way of an example, a mushroom production bed may be sized and equipped such that it has: a width of 1.3 meters, a length of 24 meters, 8 drip lines that are disposed in parallel in the casing layer, with about 6 drip emitters per meter length having each a regulated discharge rate of 0.7 liter/hour. In such a setup, Tcal can initially be set to 5 hours, K can be equal to 40 gram/m$^2$, Fu can be equal to 2 and Fd can be equal to 1.3. Following this example, If a measure M of the water evaporation in the indoor environment outside of the bed is equal to 50 gram/m^2 then $A = 50 \times 5 \times 2 = 500$ gram (i.e. 0.5 liter). This amount can be divided into pulses of 0.25 liter that are provided twice to the bed with a time difference of optionally 2 hours between the pulses. If on the other hand the measure M is equal to 30 gram/m^2 then $A = 30 \times 5 \times 1.3 = 195$ gram (i.e. about 0.2 liter), and this amount can optionally be divided into pulses of 0.1 liter that are provided twice to the bed with a time difference of 2 hours between the pulses.

Figure 4:
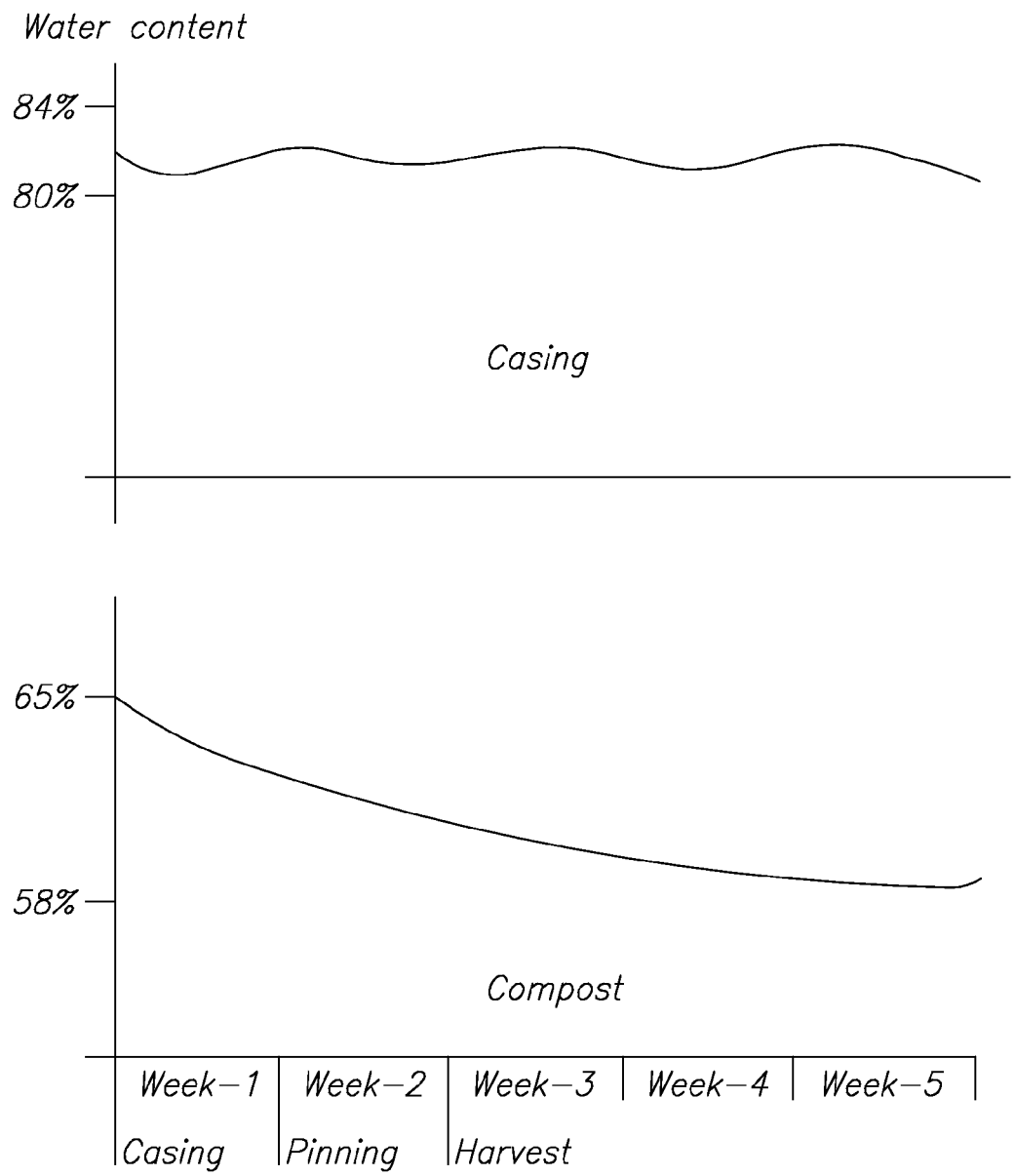
FIG. 4 shows graphs for substrate and casing layers optimal water content during the mushroom growth cycle when irrigation can be provided.

In experiments conducted by the inventors, it was demonstrated, that while typical casing layer thickness of 5.5 centimeters is used, when conventional spray irrigation is provided, with drip irrigation, it was possible to reduce the thickness of the casing layer to 3.2 centimeters, without harming the yield or the quality of the mushrooms. Attention is now drawn to FIG. 4 that shows optimal water content graphs, for the substrate and casing layers that are applicable to certain conditions and certain bed configurations that were tested by the inventors. It has been found over a period of time, during which drip irrigation can be provided, that the casing layer's water content may optimally be kept during the entire crop cycle at the needed level. With respect to the substrate (i.e. compost), on the other hand, it has been found that its water content may optimally be reduced over the same period due to physical degradation that the substrate undergoes which decreases its water holding capacity. Optionally, for conditions in a bed to substantially follow this water content pattern, it has been found that shorter pulses of water tend to affect more the humidity of the casing layer while longer pulses affect also the humidity of the substrate (compost) layer. As a result, as the production of mushrooms progresses and time passes the average length of the pulses may become shorter in order to substantially maintain the same level of humidity in the casing while reducing water content of the compost.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

The invention claimed is:

1. A method of indoor mushroom cultivation comprising the steps of:
   providing a horizontally extending bed comprising a substrate layer and a casing layer, wherein the entire casing layer is defined by an uninterrupted layer of casing material that is disposed over the substrate layer, and
   inserting drip irrigation pipes into contact with the casing layer.

2. The method according to claim 1, wherein inserting the drip irrigation pipes is performed after the casing layer has been disposed over the substrate layer.

3. The method according to claim 1, wherein inserting the drip irrigation pipes is by urging the drip irrigation pipes into the casing layer.

4. The method according to claim 3, wherein the drip irrigation pipes are urged into the casing layer by a device adapted to move in a horizontal direction above the casing layer.

5. The method according to claim 4, wherein as the device moves above a given portion of the casing layer it urges at least some of the drip irrigation pipes to be disposed into that given portion.

6. The method according to claim 1, wherein the drip irrigation pipes are disposed in the casing layer such that their apertures for discharging liquid face substantially the same given direction.

7. The method according to claim 6, wherein the given direction is up.

8. The method according to claim 1, further comprising:
   a step of irrigating liquid using the disposed drip irrigation pipes,
   wherein an amount A of liquid irrigated is determined according to parameters monitored in an indoor environment outside of the bed and parameters monitored in the bed.

9. The method according to claim 8, wherein the amount A of liquid irrigated is irrigated in pulses.

10. The method according to claim 8, wherein the parameters monitored in the indoor environment outside of the bed are associated to at least one of: a bellow communicating air to and from the indoor environment, a shutter controlling communication of air to and from the indoor environment, a temperature gauge measuring the temperature within the indoor environment outside of the bed.

11. The method according to claim 8, wherein the parameters monitored in the bed are at least one of: a moisture sensor in the casing layer, a moisture sensor in the substrate layer, a tensiometer in the casing layer, a tensiometer in the substrate layer.

12. The method according to claim 8, wherein the liquid irrigated comprises water and/or nutrient amendments.

13. The method according to claim 8, wherein the drip irrigation pipes comprise at each aperture in a respective pipe a drip emitter through which liquid passes before being discharged out of the pipe.

14. The method according to claim 13, wherein each one of the drip emitters has a discharge-pressure threshold greater than zero so that only when local liquid pressure at a location of an emitter in the pipe is greater than zero the emitter will discharge liquid from the pipe.

15. The method according to claim 14, wherein each one of the drip emitters is a regulated drip emitter that has a discharge rate of liquid out of the pipe that is substantially independent of variations in local liquid pressure at the location of the emitter in the pipe.

16. The method according to claim 15, wherein the discharge rate of liquid out of the each drip emitter is lower than 1 liter/hour.

17. The method according to claim 16, wherein the discharge rate of liquid out of each drip emitter is substantiality 0.7 liter/hour.

18. The method according to claim 1, and further comprising a step of irrigating liquid using the disposed drip irrigation pipes, and wherein an amount A of liquid irrigated is determined according to a measure M taken of water evaporation in the indoor environment outside of the bed.

19. The method according to claim 18, wherein the measure of water evaporation in the indoor environment outside of the bed is taken every N hours.

20. A method of indoor mushroom cultivation comprising the steps of:
   providing a horizontally extending bed comprising a substrate layer and a casing layer that is disposed over the substrate layer;
   inserting drip irrigation pipes into the casing layer; and
   irrigating liquid using the disposed drip irrigation pipes, and wherein an amount A of liquid irrigated is determined according to a measure M taken of water evaporation in the indoor environment outside of the bed,
   wherein the measure of water evaporation in the indoor environment outside of the bed is taken every N hours, 9, wherein the determination of the amount A of liquid irrigated is according to $A = M \times N \times F$, wherein F is a parameter determined according to the value of M.

21. The method according to claim 20, wherein K is a threshold parameter of water evaporation, Fu is a first value for F and Fd is a second value for F that is smaller than Fu, and if $M > K$ then $F = Fu$ and otherwise $F = Fd$.

22. The method according to claim 21, wherein when M and K are measured in gram to square meter of water.

23. The method according to claim 18, wherein the amount A of liquid irrigated is irrigated in pulses.

24. The method according to claim 1, wherein the substrate layer comprises compost and the casing layer includes peat moss and limestone.

25. A method of indoor mushroom cultivation comprising the steps of:
   providing a horizontally extending bed comprising a substrate layer and a casing layer wherein the entire casing layer is defined by an uninterrupted layer of casing material that is disposed over the substrate layer,
   inserting drip irrigation pipes into contact with the casing layer of the bed, and
   irrigating liquid using the disposed drip irrigation pipes, wherein an amount A of liquid irrigated is determined according to a measure M taken of water evaporation in an indoor environment outside of the bed.

26. The method according to claim 25, wherein the measure of water evaporation in the indoor environment outside of the bed is taken every N hours.

27. A method of indoor mushroom cultivation comprising the steps of:
   providing a horizontally extending bed comprising a substrate layer and a casing layer that is disposed over the substrate layer,
   inserting drip irrigation pipes into the casing layer of the bed, and
   irrigating liquid using the disposed drip irrigation pipes, wherein an amount A of liquid irrigated is determined according to a measure M taken of water evaporation in an indoor environment outside of the bed, wherein the measure of water evaporation in the indoor environment outside of the bed is taken every N hours, wherein the determination of the amount A of liquid irrigated is according to A=M×N×F, wherein F is a parameter determined according to the value of M.

28. The method according to claim 27, wherein K is a threshold parameter of water evaporation, Fu is a first value for F and Fd is a second value for F that is smaller than Fu, and if M>K then F=Fu and otherwise F=Fd.

29. The method according to claim 28, wherein when M and K are measured in gram to square meter of water.

30. The method according to claim 25, wherein the amount A of liquid irrigated is irrigated in pulses.

31. A method of indoor mushroom cultivation comprising the steps of:
   providing a horizontally extending bed comprising a substrate layer and a casing layer that is disposed over the substrate layer,
   spreading drip irrigation pipes upon the bed by a device traveling in a first horizontal direction; and
   inserting the drip irrigation pipes into the casing layer,
   wherein inserting disposing the pipes into the casing soil of the casing layer is by the device traveling in an opposing second horizontal direction.

32. The method according to claim 1, further comprising:
   compressing the casing layer after inserting the drip irrigation pipes.

33. A method of indoor mushroom cultivation comprising the steps of:
   providing a horizontally extending bed comprising a substrate layer and a casing layer that is disposed over the substrate layer,
   spreading drip irrigation pipes upon the bed by a device traveling in a first horizontal direction; inserting the drip irrigation pipes into the casing layer of the bed, and irrigating liquid using the disposed drip irrigation pipes, wherein an amount A of liquid irrigated is determined according to a measure M taken of water evaporation in an indoor environment outside of the bed,
   wherein inserting the pipes into the casing layer is by the device traveling in an opposing second horizontal direction.

34. The method according to claim 25, further comprising:
   compressing the casing layer after inserting the drip irrigation pipes.

* * * * *